(12) United States Patent
Onomura

(10) Patent No.: US 8,035,697 B2
(45) Date of Patent: Oct. 11, 2011

(54) ELECTRONIC IMAGING APPARATUS AND METHOD

(75) Inventor: Kenichi Onomura, Hino (JP)

(73) Assignee: Olympus Imaging Corp., Tokyo (JP)

( * ) Notice: Subject to any disclaimer, the term of this patent is extended or adjusted under 35 U.S.C. 154(b) by 709 days.

(21) Appl. No.: 11/811,176

(22) Filed: Jun. 8, 2007

(65) Prior Publication Data

US 2007/0296828 A1 Dec. 27, 2007

(30) Foreign Application Priority Data

Jun. 12, 2006 (JP) .................................. 2006-162611

(51) Int. Cl.
- H04N 9/73 (2006.01)
- H04N 5/228 (2006.01)
- H04N 5/222 (2006.01)
- H04N 5/225 (2006.01)
- G06K 9/00 (2006.01)

(52) U.S. Cl. ............. 348/223.1; 348/222.1; 348/333.12; 348/220.1; 382/162; 382/167

(58) Field of Classification Search ............. 348/333.01, 348/222.1, 223.1, 221.1, 224.1, 225.1, 333.02, 348/333.04, 220.1, 333.12, 272–280; 382/162, 382/167

See application file for complete search history.

(56) References Cited

U.S. PATENT DOCUMENTS

| 7,098,944 | B1 * | 8/2006 | Shiraiwa et al. | 348/222.1 |
| 7,525,697 | B2 * | 4/2009 | Suekane et al. | 358/474 |
| 2004/0212691 | A1 * | 10/2004 | Sato | 348/223.1 |
| 2007/0195181 | A1 * | 8/2007 | Onomura | 348/272 |

FOREIGN PATENT DOCUMENTS

| JP | 2001-197516 | 7/2001 |
| JP | 2004-172817 | 6/2004 |
| JP | 2004-328460 | 11/2004 |
| JP | 2004328460 A * | 11/2004 |
| JP | 2006-081083 | 3/2006 |

OTHER PUBLICATIONS

Notice of Reasons for Rejection for Japanese Patent Application No. 2006-162611, mailed Feb. 15, 2011 (4 pgs.) with translation (4 pgs.).

* cited by examiner

*Primary Examiner* — Lin Ye
*Assistant Examiner* — Marly Camargo
(74) *Attorney, Agent, or Firm* — Straub & Pokotylo; John C. Pokotylo

(57) ABSTRACT

An electronic imaging apparatus includes a color imaging device having several drive modes including at least first and second drive modes. A simultaneous shooting unit simultaneously or continuously executes an operation of acquiring a first image data by driving the color imaging device in the first drive mode and an operation of acquiring a second image data by driving the color imaging device in the second drive mode. A color conversion parameter calculator calculates color conversion parameters so that color reproduction of the first and second image data acquired by the simultaneous shooting unit becomes the same.

20 Claims, 10 Drawing Sheets

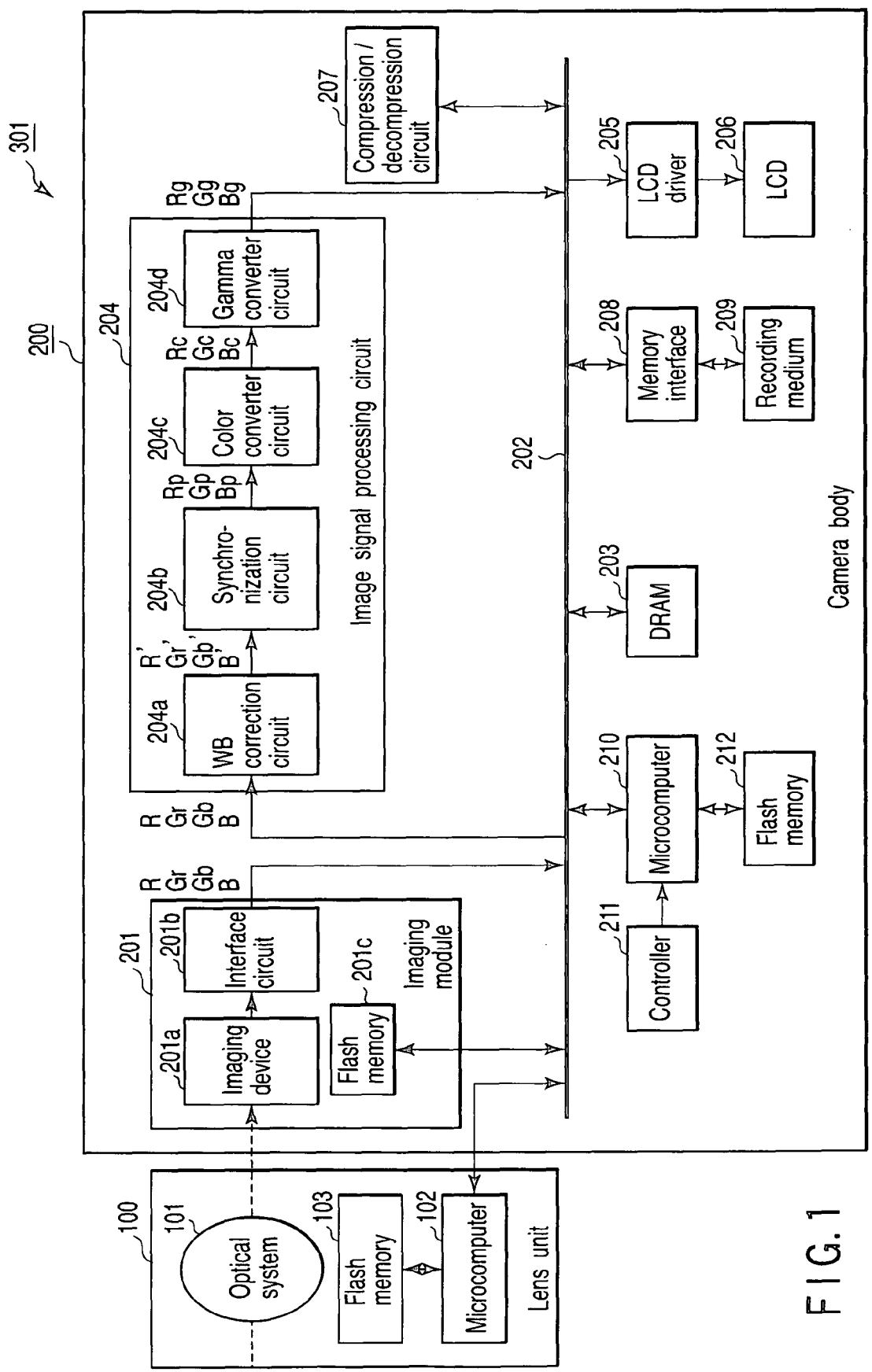
F I G. 1

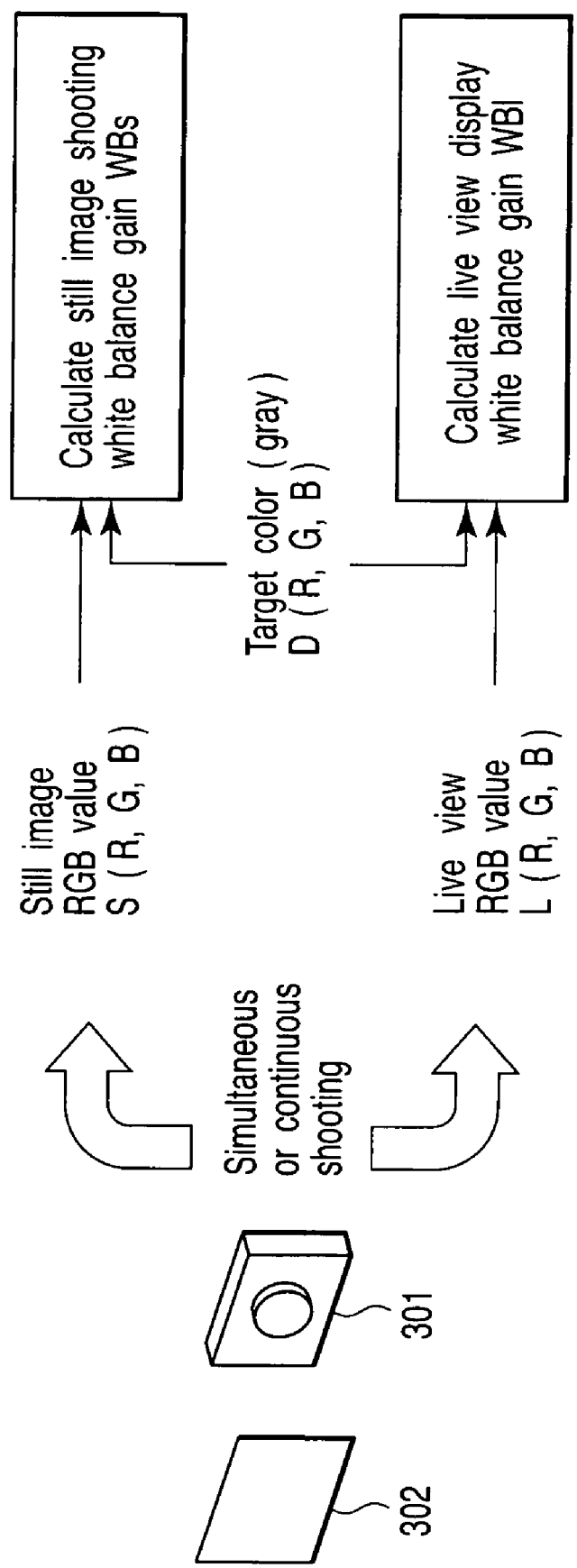
F I G. 4

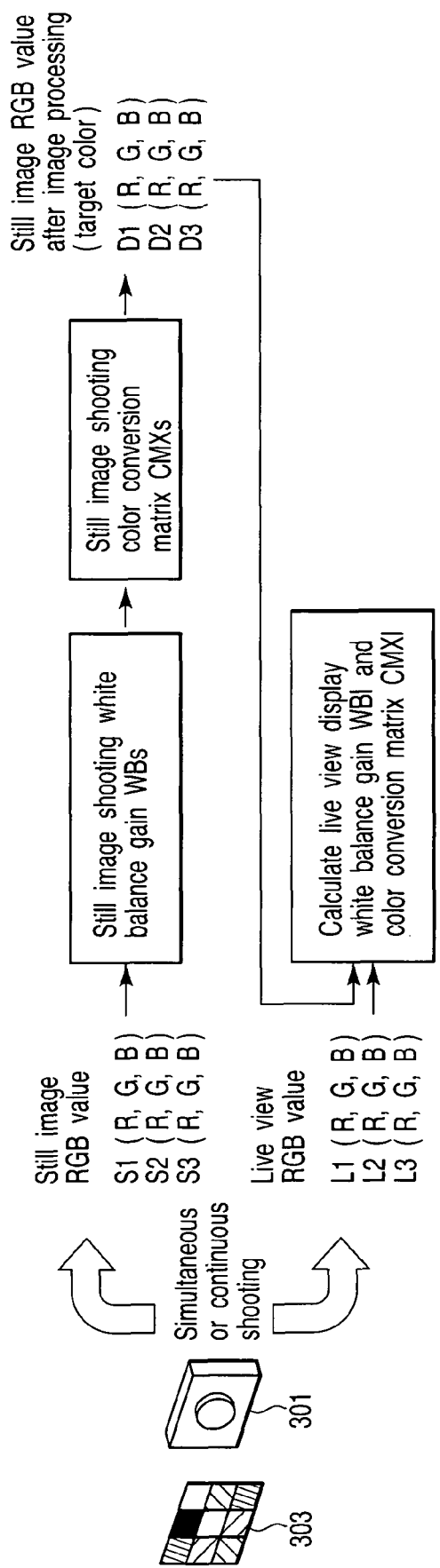
F I G. 10

ELECTRONIC IMAGING APPARATUS AND METHOD

CROSS-REFERENCE TO RELATED APPLICATIONS

This application is based upon and claims the benefit of priority from prior Japanese Patent Application No. 2006-162611, filed Jun. 12, 2006, the entire contents of which are incorporated herein by reference.

BACKGROUND OF THE INVENTION

1. Field of the Invention

The present invention relates to electronic imaging apparatus and method using a color imaging device. In particular, the present invention relates to electronic imaging apparatus and method that can provide still image shooting and live view display using a color imaging device.

2. Description of the Related Art

An electronic imaging apparatus such as a digital still camera (hereinafter, referred to as a camera) includes a color imaging device having several different drive modes. For example, the following digital still camera has been proposed. The digital still camera has a still image shooting drive mode and a live view display mode. According to the still image shooting drive mode, an imaging device output is all read to preferentially consider the quality of a recorded still image. According to the live view display mode, the image obtained by the imaging device is displayed on a display such as a LCD in real time. According to the live view display drive mode, part of the imaging device output is thinned, and thereafter, read. This is because of shortening read time of the imaging device output and imaging processing time after that, and providing real-time display.

A charge of a pixel, which is not driven, leaks into a driving pixel in the live view display drive mode. In this case, other color component is mixed in a pixel reading an output; for this reason, color mixture takes place. As a result, color reproduction is different in shooting image between the live view display drive mode and the still image shooting drive mode.

On the contrary, Jpn. Pat. Appln. KOKAI Publication No. 2004-328460 discloses the following technique. According to the technique, a ratio of an imaging device sensitivity is previously calculated in the still image shooting drive mode and a moving image shooting (or live view display) drive mode. Based on the calculated ratio, a correction operation on white balance gain is made.

BRIEF SUMMARY OF THE INVENTION

According to a first aspect of the present invention, there is provided an electronic imaging apparatus comprising: a color imaging device which has several drive modes including at least first and second drive modes; a shooting unit which continuously executes an operation of acquiring a first image data by driving the color imaging device in the first drive mode and an operation of acquiring a second image data by driving the color imaging device in the second drive mode; and a color conversion parameter calculator which calculates a color conversion parameter so that color reproduction of the first and second image data acquired by the shooting unit becomes the same.

According to a second aspect of the present invention, there is provided an electronic imaging apparatus comprising: an imaging unit which has at least two color imaging devices including first and second color imaging devices; a simultaneous shooting unit which simultaneously or continuously executes an operation of acquiring a first image data by driving the first color imaging device and an operation of acquiring a second image data by driving the second color imaging device; and a color conversion parameter calculator which calculates a color conversion parameter so that color reproduction of the first and second image data acquired by the simultaneous shooting unit becomes the same.

According to a third aspect of the present invention, there is provided an electronic imaging method using a color imaging device having several drive modes including at least first and second drive modes, comprising: continuously executing an operation of acquiring a first image data by driving the color imaging device in the first drive mode and an operation of acquiring a second image data by driving the color imaging device in the second drive mode; and calculating first and second color conversion parameters so that each of the first and second image data acquired via the continuous acquisition operation coincides with a target color data.

According to a fourth aspect of the present invention, there is provided an electronic imaging method using a color imaging device having several drive modes including at least first and second drive modes, comprising: continuously executing an operation of acquiring a first image data by driving the color imaging device in the first drive mode and an operation of acquiring a second image data by driving the color imaging device in the second drive mode; processing the first image data acquired via the continuous acquisition operation using an arbitrary color conversion parameter to generate a third image data; and calculating a third color conversion parameter so that color reproduction of the second image data acquired via the continuous acquisition operation coincides with that of the third image data.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of an electronic imaging apparatus according to a first embodiment of the present invention;

FIG. 4 is a view to explain the concept when white balance gain is calculated as a color conversion parameter of the first embodiment in particular;

FIG. 10 is a view to explain the concept when white balance gain and color conversion matrix are calculated according to a third embodiment.

DETAILED DESCRIPTION OF THE INVENTION

Figure 2:
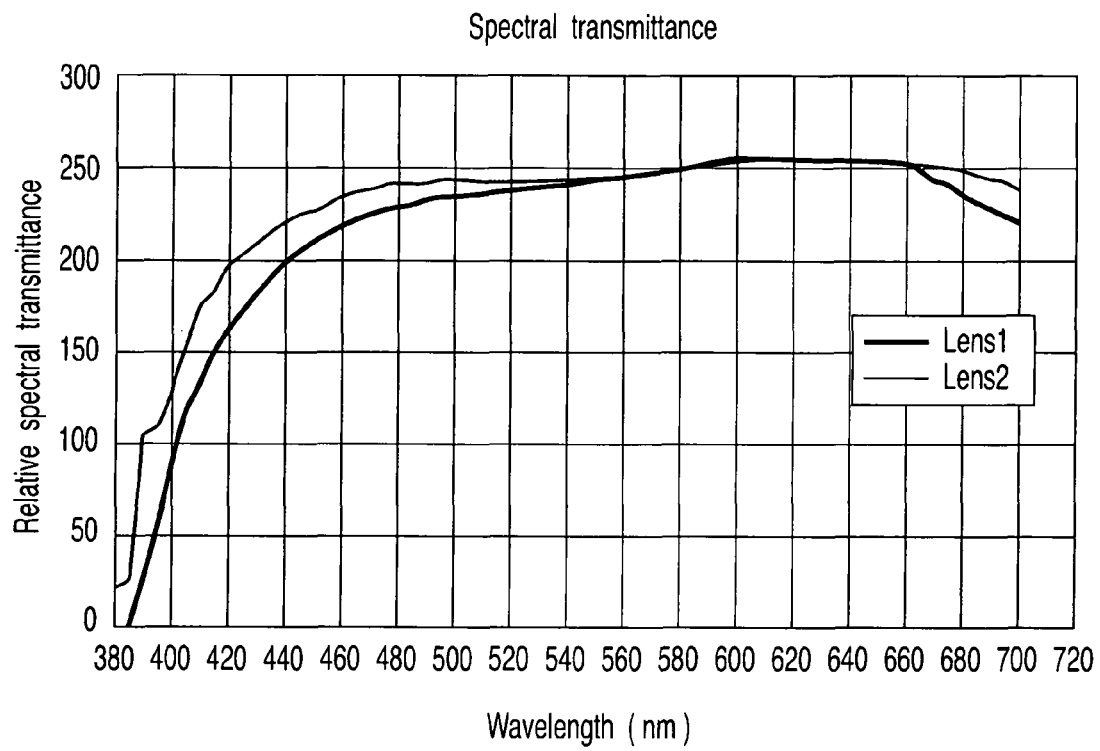
FIG. 2 is a graph showing spectral transmittance characteristic of an optical system.

Various embodiments of the present invention will be hereinafter described with reference to the accompanying drawings.

First Embodiment

FIG. 1 is a block diagram showing the configuration of an electronic imaging apparatus according to a first embodiment of the present invention. In FIG. 1, there is shown a single-lens reflex digital still camera 301. The digital still camera 301 is composed of a removably detachable lens unit 100 and a camera body 200.

The lens unit 100 given as an optical lens is provided with an optical system 101. The optical system 101 comprises a focusing lens, an aperture and a variable magnification lens. The optical system 101 of the lens unit 100 collects light from a subject (not shown) into an imaging device 201a built in the camera body. In FIG. 1, various lenses forming the optical system 101 are actuated by lens actuator mechanism (not shown). The aperture is actuated by an aperture actuator mechanism (not shown).

The lens unit 100 is further provided with a microcomputer 102 and a flash memory 103. The microcomputer 102 controls various components included in the lens unit 100 in accordance with instructions from the camera body 200. For example, the microcomputer 102 actuates the lens actuator mechanism (not shown) to control a focus of the optical system 101 and actuates the aperture actuator mechanism (not shown) to control an exposure of the imaging device 201a, in accordance with instructions from the camera body 200. The flash memory 103 stores various programs executed by the microcomputer 102 and data relevant to the optical system 101. According to the first embodiment, at least spectral transmittance characteristic of the optical system 101 is stored as data relevant to the optical system 101. FIG. 2 is a graph showing spectral transmittance characteristic of the optical system. In FIG. 2, there are shown characteristics relevant to two kinds of optical systems. However, in this case, the flash memory 103 may store spectral transmittance characteristic only corresponding to the optical system 101. Moreover, the flash memory 103 may be stored with information required for auto-focus such as focal distance information of the optical system 101 in addition to the foregoing spectral transmittance characteristic.

The lens unit 100 and the camera body 200 are configured to freely make communications when they are attached each other. When the lens unit 100 is attached to the camera body 200, data relevant to the optical system 101 stored in the flash memory 103 is send-able to the camera body 200.

The camera body 200 includes an imaging module 201, a bus 202, DRAM 203, an image signal processing circuit 204, an LCD driver 205 and an LCD 206. The camera body 200 further includes a compression/decompression circuit 207, a memory interface (I/F) 208, a recording medium 209, a microcomputer 210, a controller 211, and a flash memory 212.

The imaging module 201 receives a subject incident via the optical system 101 to obtain image data (RAW data). The imaging module 201 has an imaging device 201a, an interface (I/F) circuit 201b and a flash memory 201c.

The imaging device 201a is a color imaging device having Bayer-array color filters arranged at the front side. The Bayer array is configured so that a line comprising R pixel and G (Gr) pixel and a line comprising G (Gb) pixel and B pixel are alternately arranged. Incidentally, the imaging device 201a may be CMOS or CCD imaging device.

The imaging device 201a receives lights incident via the optical system 101 using pixels to photo-electrically convert the lights. Then, the imaging device 201a outputs charges obtained by the foregoing photo-electrical conversion as an image signal. According to the first embodiment, the imaging device 201a is drivable in at least two modes given below. One is a still image shooting drive mode (first drive mode), and another is a live view display drive mode (second drive mode). The still image shooting drive mode given as the first drive mode is a drive mode of all reading outputs from effective pixels of the imaging device to preferentially consider the quality of a recorded still image. On the other hand, the live view display drive mode given as the second drive mode is a drive mode of thinning and read part of the output of the imaging device to perform real-time display.

The interface circuit 201b executes analog processing such as noise removal, waveform shaping and amplification with respect to the image signal read from the imaging device 201a. Further, the interface circuit 201b converts the foregoing processed analog image signal into a digital signal to obtain image data (RAW data comprising three-colors four-components, that is, R, Gr, Gb and B). The flash memory 201c stores various data relevant to the imaging device 201a. For example, sensitivity characteristic of the imaging device 201a is given as data relevant to the imaging device 201a. In this case, the imaging device 201a stores sensitivity characteristics for still image shooting drive mode and live view display drive mode.

The bus 202 is connected with the foregoing imaging module 201, DRAM 203, image signal processing circuit 204, LCD driver 205, compression/decompression circuit 207, memory interface 208, and microcomputer 210. The bus 202 functions as a transfer path for transferring various data generated in the camera to various components included in the camera. The image data (RAW data) captured by the imaging module 201 is transferred to the DRAM 203, and thereafter, stored therein. The DRAM 203 functions as storage for temporarily storing various data. The various data include image data obtained by the interface circuit 201b of the imaging module 201 and image data processed by the image signal processing circuit 204 and the compression/decompression circuit 207.

The image signal processing circuit 204 reads image data (RAW data) stored in the DRAM to execute image processing. The image signal processing circuit 204 has a white balance (WB) correction circuit 204a, a synchronization circuit 204b, a color converter circuit 204c and a gamma converter circuit 204d.

The WB correction circuit 204a multiplies R and B data of the image data read from the DRAM 203 by white balance gain instructed from the microcomputer 210. In this way, the WB correction circuit 204a makes white balance corrections to acquire image data R', Gr', Gb' and B' after white balance corrections. Then, the WB correction circuit 204a outputs the foregoing image data R', Gr', Gb' and B' to the synchronization circuit 204b. The synchronization circuit 204b generates image data Rp, Gp and Bp from image data R', Gr', Gb' and B' given from the WB correction circuit 204a. In this case, the foregoing image data Rp, Gp and Bp are set so that three colors, that is, R, G and B are given as one pixel component by interpolation. Then, the synchronization circuit 204b outputs image data Rp, Gp and Bp to the color converter circuit 204c. The color converter circuit 204c makes linear conversion to correct the color of the image data in the following manner. Specifically, the freeing image data Rp, Gp and Bp from the synchronization circuit 204b is multiplied by color conversion matrix instructed from the microcomputer 210, and thereby, linear conversion is made. Thereafter, the color converter circuit 204c outputs image data Rc, Gc and Bc to the gamma converter circuit 204d.

The gamma converter circuit 204d executes gamma conversion (gray level transformation) with respect to image data Rc, Gc and Bc from the color converter circuit 204c. In this way, the gray level of the image data is corrected to be suitable to display and print. Thereafter, the gamma converter circuit 204d stores image data Rg, Gg and Bg in the DRAM 203.

The LCD drive 205 displays an image on the LCD 206. For example, in the live view display, the LCD driver 205 reads image data from the DRAM 203, and converts it into a video signal. Then, the LCD driver executes live view display on the LCD 206 based on the video signal. In this case, the foregoing image data is acquired by the imaging module 201, and subjected to live view display image processing via the image signal processing circuit 204.

The compression/decompression circuit 207 reads image data from the DRAM 203, and compresses it according to a JPEG format. In this case, the foregoing image data is acquired by the imaging module 201, and subjected to still image shooting image processing via the image signal processing circuit 204. The compressed image data is stored in the DRAM 203, and thereafter, recorded in the recording medium 209 via the memory interface 208. In this case, the recording medium is not specially limited, and for example, a memory card is usable. In still image reproducing, the compression/decompression circuit 207 reads the still image recorded in the recording medium 209, and decompresses it. The decompressed image data is temporarily stored in the DRAM 203, and thereafter, the LCD driver 205 displays it on the LCD 206.

Figure 3:
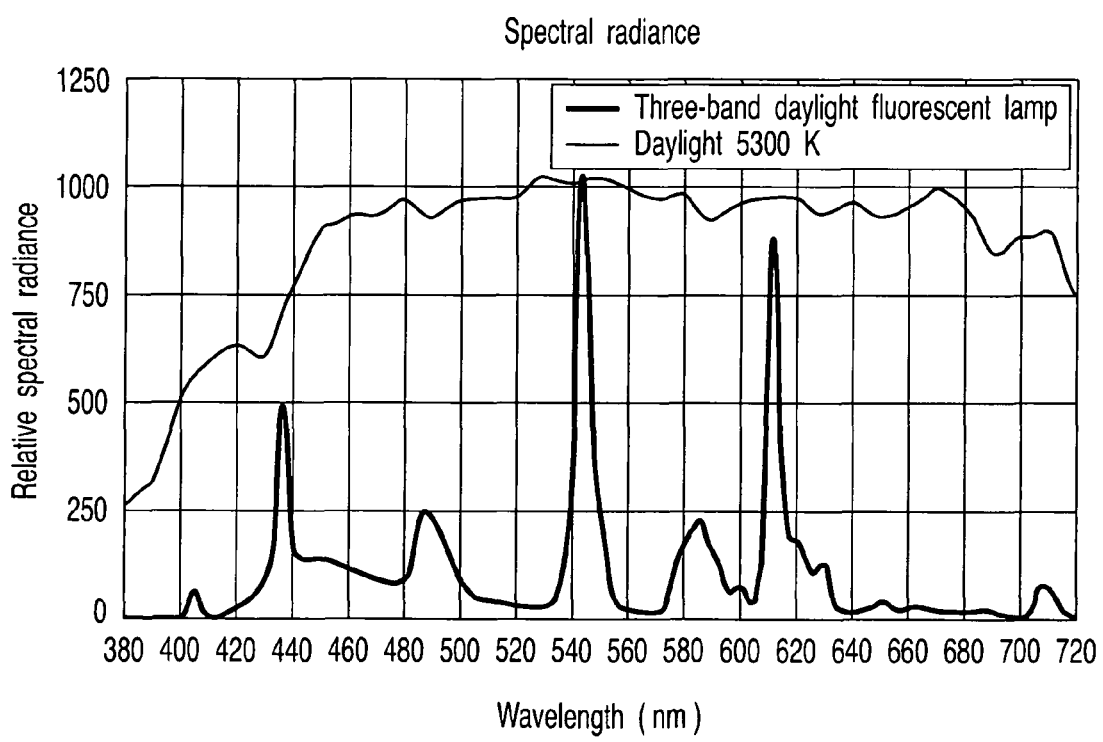
FIG. 3 is a graph showing spectral radiance characteristic.

The microcomputer 210 has a function as a simultaneous shooter and a color conversion parameter calculator. The microcomputer 210 collectively controls various sequences of the camera body 200. The microcomputer 210 is connected with a controller 211 and a flash memory 212. The controller 211 includes various operation members. One is a power button for turning the camera power on, and another is a release button for shooting a still image. Another is a one-touch white balance (OTWB) button for manually adjusting white balance by the user. When the user operates the controller 211, the microcomputer 210 executes various sequences corresponding to the user's operation such as still image shooting. The flash memory 212 stores a RGB value of a target color when white balance gain described later is calculated and spectral radiance characteristic of various light sources (For example, sunlight, a light source of A, and a daylight fluorescent lamp are given as the light source). FIG. 3 shows spectral radiance characteristic. In FIG. 3, there are shown spectral radiances of a three-band daylight fluorescent lamp and daylight. These three-band daylight fluorescent lamp and daylight have relatively close color temperature (about 5000 K to 6000 K). However, the spectral characteristic is largely different. For this reason, spectral radiance of the light source must be considered in addition to color temperature in order to correct white balance.

The following is an explanation about color conversion parameter (white balance gain and color conversion matrix) in the first embodiment. FIG. 4 is a view to explain the concept when white balance gain is particularly calculated as the color conversion parameter. According to the first embodiment, white balance gain is calculated. This is given for calculating the white balance gain used for one-touch white balance corrections when the user manually makes white balance setting. For example, in auto white balance except the one-touch white balance, the white balance gain is calculated using the following characteristics. One is a lens spectral transmittance characteristic shown in FIG. 2, and another is a light source spectral radiance characteristic. Another is a spectral sensitivity characteristic of the imaging device 201a. This method is different from the subject matter of this embodiment; therefore, the explanation is omitted.

As shown in FIG. 4, in order to calculate white balance, the imaging device 201a of the camera 301 is operated in the first and second drive modes to shoot the same subject (e.g., gray chart) 302. In this case, the first and second drive mode shootings are simultaneously (or continuously as if the shooting is simultaneous made) made under the following shooting condition. According to the shooting condition, a state of light source illuminating a subject has no change between the first and second drive mode shootings.

After the foregoing continuous shooting, still image shooting white balance gain WBs is calculated from image data (first image data) obtained by the first drive mode. Further, live view display white balance gain WBl is calculated from image data (second image data) obtained by the second drive mode. Specifically, the following coefficient is calculated as the still image shooting white balance gain WBs. The coefficient sets RGB value S (R, G, B) of the image data acquired by the first drive mode as a target color RGB value D (R, G, B). Moreover, the following coefficient is calculated as the live view display white balance gain WBl. The coefficient sets RGB value L (R, G, B) of the image data acquired by the second drive mode as D (R, G, B). The target color RGB value D (R, G, B) is a color RGB value of the color included in the color of the shooting subject. Namely, In FIG. 4, the target color RGB value D (R, G, B) is a gray RGB value.

Figure 5:
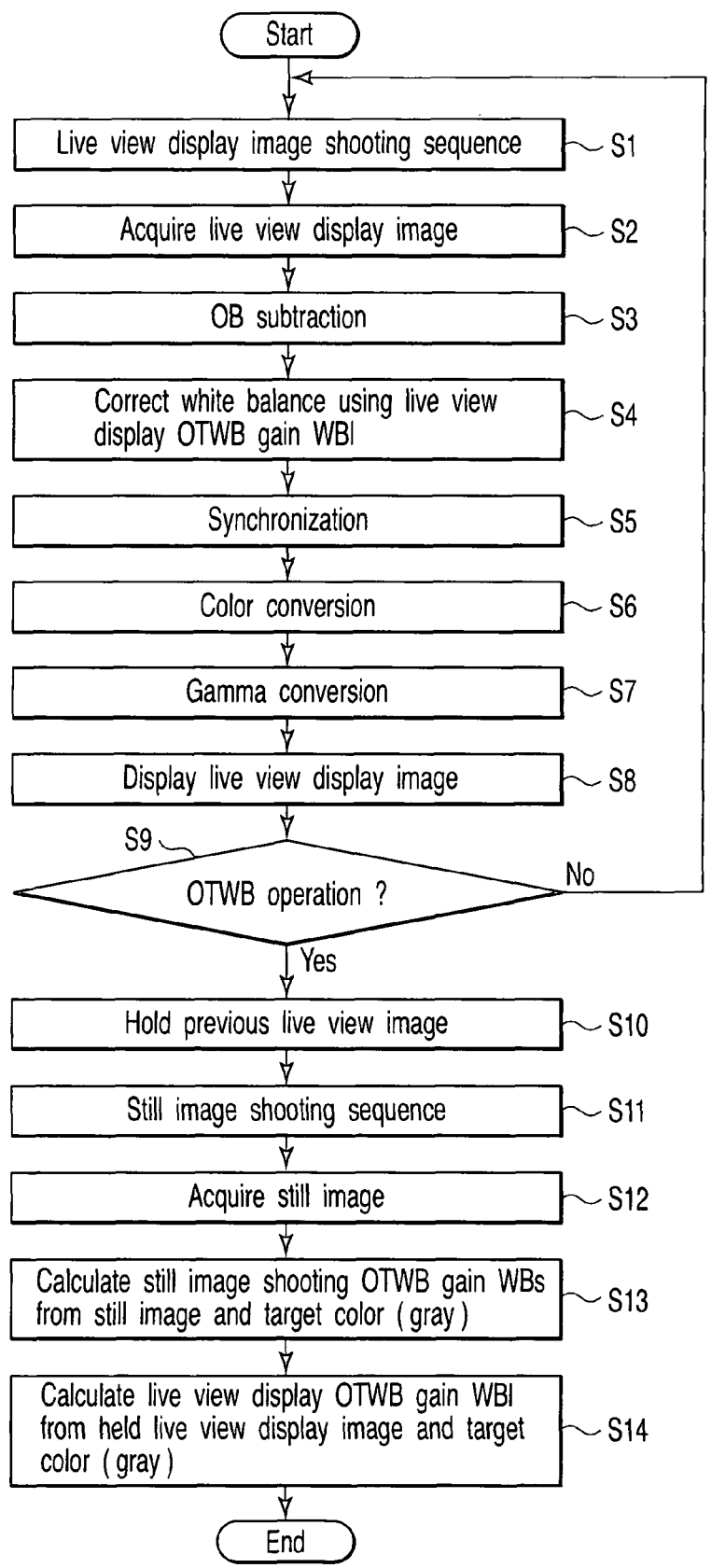
FIG. 5 is a flowchart to explain a first example of calculating white balance gain in the first embodiment.

The calculation flow will be hereinafter described. FIG. 5 is a flowchart showing a first example of calculating white balance gain in the first embodiment. The procedure of FIG. 5 corresponds to the case where live view display is made before still image shooting.

In FIG. 5, the microcomputer 210 takes a procedure for live view display on the LCD 206. Thus, the microcomputer 210 operates the imaging device 201a of the imaging module 201 in the second drive mode (step S1). In this way, the imaging device 201a acquires live view display image data (step S2). The imaging device 201a stores the obtained live view display image data in the DRAM 203 via the bus 202.

An OB subtraction circuit (not shown) executes OB subtraction with respect to the image data stored in the DRAM 203 (step S3). According to the foregoing OB subtraction, OB (Optical Black) component is subtracted from the image data read from the DRAM 203. In this way, a black level of the acquired image data is set to zero.

After the OB subtraction, the microcomputer 210 reads the live view display white balance gain WBl calculated by the previous white balance calculation and stored in the flash memory 212, and then, outputs it to the WB correction circuit 204. The WB correction circuit 204a makes white balance corrections in the following manner (step S4). Namely, the circuit 204a multiplies the OB subtracted image data by the live view display white balance gain WBl notified from the microcomputer 210. The synchronization circuit 204b executes synchronization processing with respect to white balance corrected image data (step S5). The microcomputer 210 reads a live view display color conversion matrix stored in the flash memory 212, and then, outputs it to the color converter circuit 204c. The color converter circuit 204c executes color conversion in the following manner (step S6). The circuit 204c multiplies the live view display color conversion matrix notified from the microcomputer 210 by the image data. The gamma converter circuit 204d executes gamma conversion with respect to an output of the color converter circuit 204c (step S7).

The foregoing image processing is executed, and thereafter, the LCD driver 205 reads image data from the DRAM 203, and then, displays it as a live view image on the LCD 206 (step S8).

While the live view display procedures described in step S1 to step S8 are taken, the microcomputer 210 determines whether or not the user makes the following operation (step S9). Namely, the microcomputer 210 determines whether or not the user makes an operation for setting a white balance gain for one-touch white balance (OTWB) (hereinafter, referred to as OTWB operation). According to the OTWB operation, for example, the user presses a release button while pressing the OTWB button. Of course, the foregoing operation may not be made. In step S9, if the user does not make the OTWB operation, the procedure sequence returns to step S1, and then, the microcomputer 210 continues live view display.

On the other hand, if the user makes the OTWB operation in step S9, the microcomputer 210 takes the following procedure. Specifically, the microcomputer 210 holds a RGB value L (R, G, B) of live view display image data acquired by the imaging device 201a just before the user makes the OTWB operation in the DRAM 203 (step S10).

After holding L (R, G, B) in the DRAM 203, the microcomputer 210 operates the imaging device 201a of the imaging module 201 in the first drive mode (step S11). In this way, the imaging device 201a acquires still image data (step S12). Then, the imaging device 201a stores the obtained still image data in the DRAM 203 via the bus 202.

The microcomputer 210 reads still image data stored in the DRAM 203, and then, calculates the following coefficient as still image shooting white balance gain WBs (step S13). The coefficient sets a RGB value S (R, G, B) of the still image data as a RGB value D (R, G, B) of a target color (gray) stored in the flash memory 212. The microcomputer 210 reads a RGB value L (R, G, B) of live view display image data held in the DRAM 203 in step S10, and then, calculates the following coefficient as live view display white balance gain WBl (step S14). The coefficient sets a RGB value L (R, G, B) of the live view display image data as a RGB value D stored in the flash memory 212. Via the foregoing procedure, the calculation of white balance gain ends. In this case, still image shooting white balance gain WBs calculated in step S13 and live view display white balance gain WBl calculated in step S14 are stored in the flash memory 212.

According to the foregoing procedure described in FIG. 5, the imaging device 201a is operated in the first and second drive modes to shoot the same subject. In this way, the shooting condition of light source illuminating a subject has no change in the first drive mode shooting and the second drive mode shooting. Thus, white balance gain is calculated to match image data obtained from each of the foregoing two modes with the same target color. This serves to make white balance corrections so that the same color reproduction is obtained in live view display and still image display.

In FIG. 5, white balance gain is calculated in accordance with OTWB operation by the user. Namely, the user can set white balance gain for one-touch white balance at a desired timing.

In FIG. 5, the gray chart 302 is shot; in this case, the subject is not limited to the gray chart so long as it is gray. However, in order to calculate proper white balance gain, it is preferable to shoot a subject having a low saturation color such as gray. Three or more target colors are previously set, and a subject having three colors or more is shot. In this way, color conversion matrix calculation is possible in addition to white balance gain. The foregoing procedure will be described later.

Figure 6:
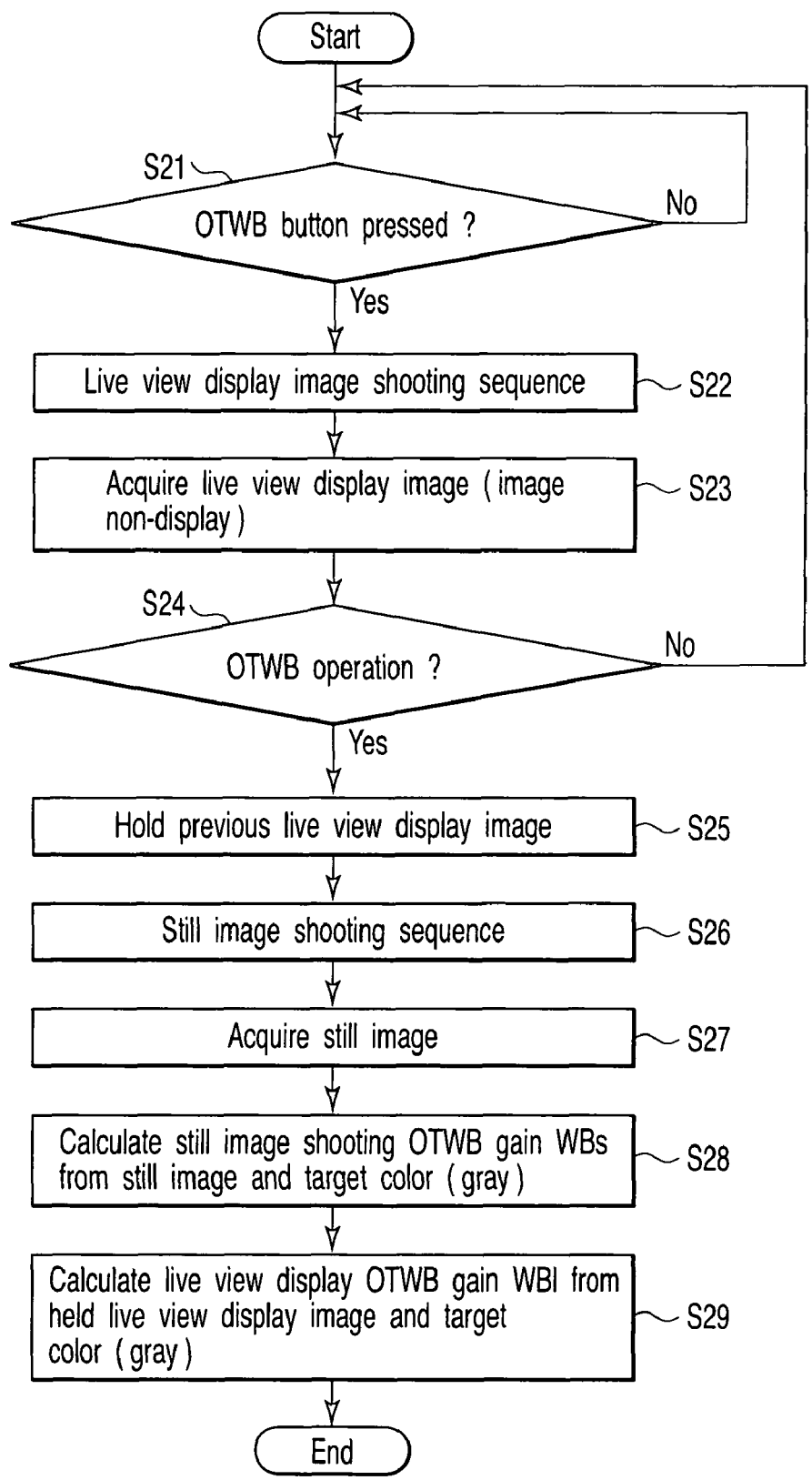
FIG. 6 is a flowchart to explain a second example of calculating white balance gain in the first embodiment.

FIG. 6 is a flowchart to explain a second example of calculating white balance gain in the first embodiment. This second example is a procedure corresponding to the case where live view display is not made before still image shooting.

In FIG. 6, the microcomputer 210 determines whether or not the user presses an OTWB button (step S21). In this case, the microcomputer stands by until the OTWB button is pressed. In step S21, if the OTWB button is pressed, the microcomputer 210 operates the imaging device 201a of the imaging module 201 in the second drive mode (step S22). In this way, the imaging device 201a acquires live view display image data (step S23). The imaging device 201a stores the obtained image data in the DRAM 203 via the bus 202.

The live view display image data is stored in the DRAM 203, and thereafter, the microcomputer 210 determines whether or not the user makes a one-touch white balance (OTWB) operation (step S24). In step S24, if the user does not make the OTWB operation, the flow returns to step S21.

On the other hand, if the user makes the OTWB operation, the microcomputer 210 holds a RGB value L (R, G, B) of live view display image data acquired by the imaging device 201a in the DRAM 203 just before the user makes the OTWB operation (step S25). The imaging device 201a of the imaging module 201 is operated in the first drive mode (step S26). In this way, the imaging device 201a acquires still image data (step S27). The imaging device 201a stores the obtained still image data in the DRAM 203 via the bus 202.

The microcomputer 210 reads still image data stored in the DRAM 203, and then, calculates the following coefficient as still image shooting white balance gain WBs (step S28). The coefficient sets a RGB value S (R, G, B) of the still image data as a RGB value D (R, G, B) of a target color (gray) stored in the flash memory 212. The microcomputer 210 reads a RGB value L (R, G, B) of live view display image data held in the DRAM 203 in step S25, and then, calculates the following coefficient as live view display white balance gain WBl (step S29). The coefficient sets a RGB value L (R, G, B) of the live view display image data as a RGB value D (R, G, B) stored in the flash memory 212. Via the foregoing procedure, the calculation of white balance gain ends.

According to the second example, even if the user sets so that live view display is not made before shooting, white balance gain for one-touch white balance is calculated.

Figure 7:
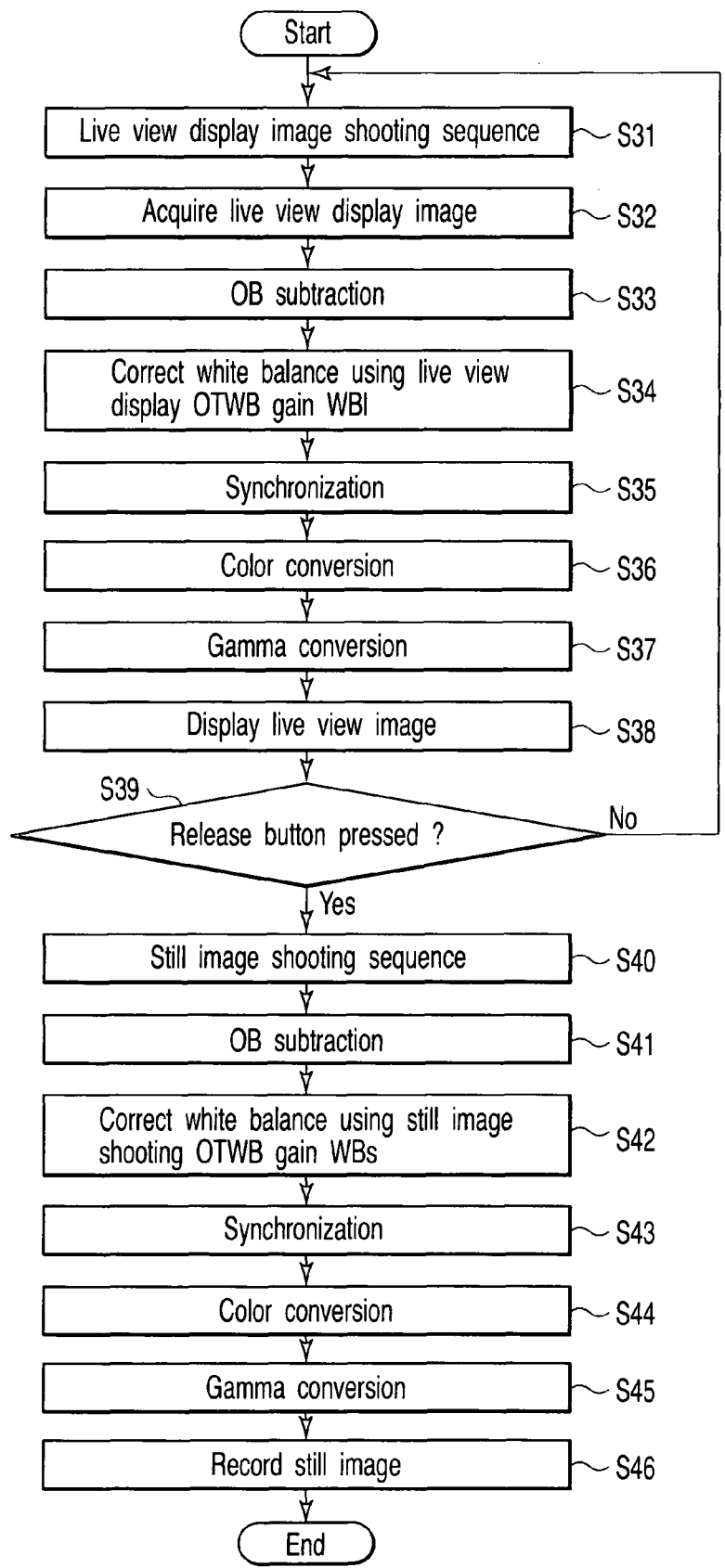
FIG. 7 is a flowchart to explain a still image shooting procedure when white balance correction is made using one-touch white balance.

FIG. 7 is a flowchart to explain a still image shooting procedure when white balance corrections are made using one-touch white balance.

In FIG. 7, the microcomputer 210 takes a procedure of executing live view display with respect to the LCD 206. Thus, the microcomputer 210 operates the imaging device 201a of the imaging module 201 in the second drive mode (step S31). In this way, the imaging device 201a acquires live view display image data (step S32). The imaging device 201a stores the obtained image data in the DRAM 203 via the bus 202.

An OB subtraction circuit (not shown) executes OB subtraction with respect to the image data stored in the DRAM 203 (step S33). Then, the microcomputer 210 reads the live view display white balance gain WB1 calculated by the calculation of FIG. 5 or FIG. 6 and stored in the flash memory 212, and then, outputs it to the WB correction circuit 204. The WB correction circuit 204a makes white balance corrections in the following manner (step S34). Namely, the circuit 204a multiplies the OB subtracted image data by the live view display white balance gain WB1 notified from the microcomputer 210. The synchronization circuit 204b executes synchronization processing with respect to white balance corrected image data (step S35). The microcomputer 210 reads a live view display color conversion matrix stored in the flash memory 212, and then, outputs it to the color converter circuit 204c. The color converter circuit 204c executes color conversion in the following manner (step S36). The circuit 204c multiplies the live view display color conversion matrix notified from the microcomputer 210 by the image data. The gamma converter circuit 204d executes gamma conversion with respect to an output of the color converter circuit 204c (step S37).

The foregoing image processing is executed, and thereafter, the LCD driver 205 reads image data from the DRAM 203, and then, displays it as a live view image on the LCD 206 (step S38).

While live view display described in step S31 to S38 is made, the microcomputer 210 determines whether or not the user presses a release button of the controller 211 (step S39). In step S39, if the user does not press the release button, the procedure returns to step S31, and then, the microcomputer 210 continues live view display. On the other hand, if the user presses the release button in step S39, the microcomputer 210 operates the imaging device 201a of the imaging module 201 in the first drive mode (step S40). In this way, the imaging device 201a acquires still image data. The imaging device 201a stores the obtained still image data in the DRAM 203 via the bus 202.

The OB subtraction is made with respect to the image data stored in the DRAM 203 (step S41). The microcomputer 210 reads still image shooting white balance gain WBs calculated by the calculation of FIG. 5 or FIG. 6 and stored in the flash memory 212, and then, outputs it to the WB correction circuit 204a. The WB correction circuit 204a makes white balance corrections in the following manner. Namely, the circuit 204a multiplies the still image shooting white balance gain WBs notified from the microcomputer 210 by the image data. Thereafter, the WB correction circuit 204a outputs the obtained image data to the synchronization circuit 24b (step S42). The foregoing procedures are taken, and thereby, white balance corrections are made so that the same color reproduction is obtained in live view display and still image shooting. After white balance correction is made, the synchronization circuit 204b executing synchronization processing (step S43). The microcomputer 210 reads a still image shooting color conversion matrix stored in the flash memory 212, and then, outputs it to the color converter circuit 204c. The color converter circuit 204c makes color conversion in the following manner (step S44). Namely, the circuit 204c multiplies the still image shooting color conversion matrix notified from the microcomputer 210 by the image data. The gamma converter circuit 204d makes gamma conversion with respect to an output of the color converter circuit 204c (step S45).

The foregoing image processing is executed, and thereafter, the compression/decompression circuit 207 reads image data after image processing from the DRAM 203, and then, stores it in the DRAM 203. The microcomputer 210 reads the compressed image data stored in the DRAM 203, and then, records the read compressed image data in the recording medium 209 via the memory interface 208 (step S46).

According to the first embodiment, live view display image data and still image shooting image data are acquired under the same condition as described above. Moreover, white balance gain is calculated so that each of the foregoing two image data has the same white balance. In this way, the same white balance is obtained in still image shooting and live view display regardless of a shooting environment.

Second Embodiment

Figure 8:
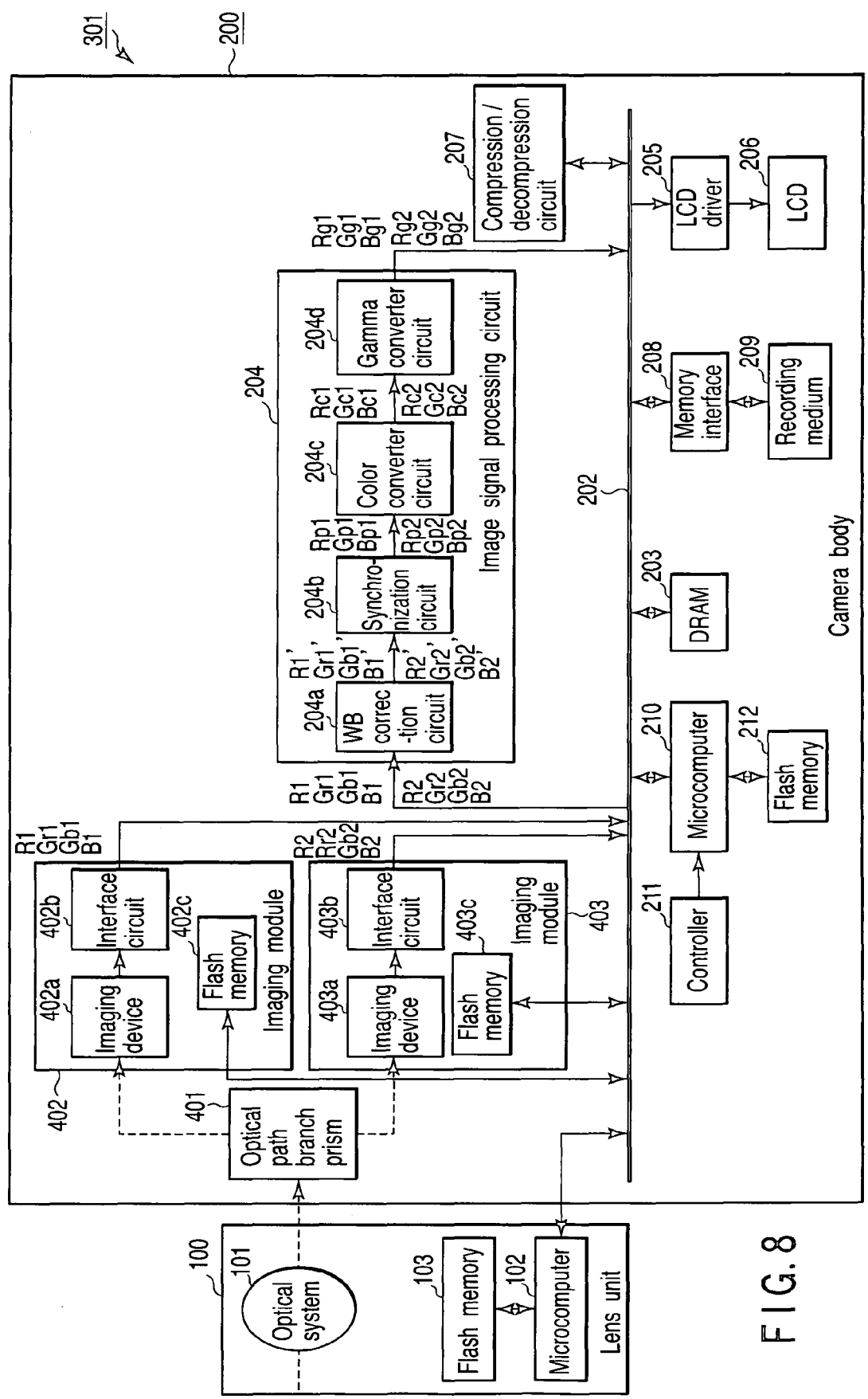
FIG. 8 is a block diagram showing the configuration of an electronic imaging apparatus according to a second embodiment of the present invention.

A second embodiment of the present invention will be hereinafter described. FIG. 8 is a block diagram showing the configuration of an electronic imaging apparatus according to a second embodiment of the present invention. In FIG. 8, components having the same reference numeral as FIG. 1 have the same configuration as FIG. 1; therefore, the explanation is omitted. A camera body 200 of a camera 301 shown in FIG. 8 is provided with an optical path branch prism 401. The optical path branch prism 401 branches light collected by the optical system 101 so that one of the branched lights is incident on an imaging module 402 and the other light thereof is incident on an imaging module 403. The foregoing configuration is given, and thereby, light from a subject can be simultaneously incident on two imaging modules.

The imaging module 402 functions as a live view display imaging module. The imaging module 402 is composed of an imaging device 402a, interface circuit 402b and a flash memory 402c. On the other hand, the imaging module 403 functions as a still image shooting imaging module. The imaging module 403 is composed of an imaging device 403b, interface circuit 403b and a flash memory 403c. In this case, these imaging modules 402 and 403 may be the same configuration, or may be configured as follows. Namely, the number of pixels of the live view display imaging device 402a may be set less than that of the still image shooting imaging device 403a.

In the configuration shown in FIG. 8, image data obtained by the imaging module 402 is subjected to image processing for live view display in the image signal processing circuit 204. On the other hand, image data obtained by the imaging module 403 is subjected to image processing for still image shooting in the image signal processing circuit 204. The image processing for live view display and still image shooting are successively may be executed in one image signal processing circuit. Moreover, the foregoing two image processings may be independently executed using two image signal processing circuits.

Figure 9:
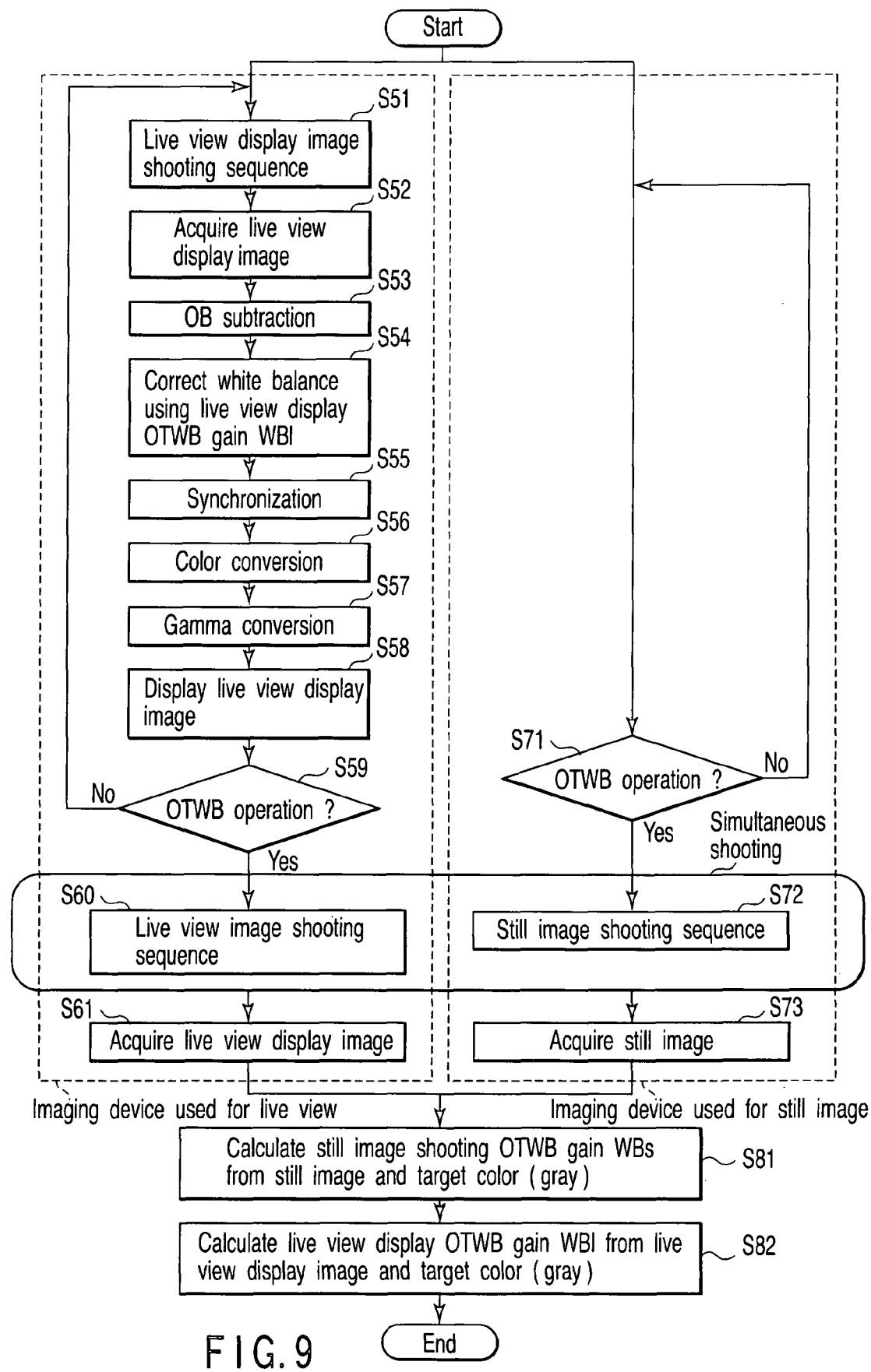
FIG. 9 is a flowchart to explain a procedure of calculating white balance gain in the second embodiment.

FIG. 9 is a flowchart to explain a procedure of calculating white balance gain in the second embodiment. The procedure of FIG. 9 corresponds to a procedure of the case of making live view display before still image shooting. Moreover, when the procedure of FIG. 9 is taken, the user shoots a gray chart 302 using the camera 301.

In FIG. 9, the microcomputer 210 takes a procedure of making live view display on the LCD 206. Thus, the microcomputer 210 operates the imaging device 402a of the imaging module 402 (step S51). In this way, the imaging device 402a acquires live view display image data (step S52). The imaging device 402a stores the obtained live view display image data in the DRAM 203 via the bus 202.

An OB subtraction circuit (not shown) executes OB subtraction processing with respect to the image data stored in the DRAM 203 (step S53). The microcomputer 210 reads the live view display white balance gain WBl calculated by the previous calculation and stored in the flash memory 212, and then, outputs it to the WB correction circuit 204. The WB correction circuit 204a makes white balance corrections in the following manner (step S54). Namely, the circuit 204a multiplies the OB subtracted image data by the live view display white balance gain WBl notified from the microcomputer 210. The synchronization circuit 204b executes synchronization processing with respect to white balance corrected image data (step S55). The microcomputer 210 reads a live view display color conversion matrix stored in the flash memory 212, and then, outputs it to the color converter circuit 204c. The color converter circuit 204c executes color conversion in the following manner (step S66). The circuit 204c multiplies the live view display color conversion matrix notified from the microcomputer 210 by the image data. The gamma converter circuit 204d executes gamma conversion with respect to an output of the color converter circuit 204c (step S57).

The foregoing image processing is executed, and thereafter, the LCD driver 205 reads image data from the DRAM 203, and then, displays it as a live view image on the LCD 206 (step S58).

While the live view display described in step S51 to step S58 is made, the microcomputer 210 determines whether or not the user makes a one-touch white balance (OTWB) operation (step S59, S71). In steps S59 and S71, if the user does not make the OTWB operation, the procedure sequence returns to step S51, and then, the microcomputer 210 continues the live view display.

On the other hand, in steps S59 and S71, the user makes the OTWB operation, the microcomputer 210 simultaneously operates the imaging device 402a of the imaging module 402 and the imaging device 403a of the imaging module 403 (step S60, S72). In this way, the imaging device 402a acquires live view display image data (step S61). On the other hand, the imaging device 403a acquires still image shooting image data (step S73). Each image data obtained by the foregoing imaging devices is stored in the DRAM 203 via the bus 202.

The microcomputer 210 reads still image data stored in the DRAM 203, and then, calculates the following coefficient as still image shooting white balance gain WBs (step S81). The coefficient sets a RGB value S (R, G, B) of the still image data as a RGB value D (R, G, B) of a target color (gray) stored in the flash memory 212. The microcomputer 210 reads live view display image data stored in the DRAM 203, and then, calculates the following coefficient as live view display white balance gain WBl (step S82). The coefficient sets a RGB value L (R, G, B) of the live view display image data as a RGB value D (R, G, B) stored in the flash memory 212. Via the foregoing procedures, the calculation of the white balance gain ends.

According to the second embodiment, the still image and the live view display image are fully simultaneously acquired. Therefore, the white balance gain is calculated with high accuracy as compared with the first embodiment.

Third Embodiment

A third embodiment of the present invention will be hereinafter described. FIG. 10 is a view to explain the concept when color conversion parameters (white balance gain and color conversion matrix) are calculated according to the third embodiment. The configuration of a camera may be any of FIG. 1 and FIG. 8; in this case, the explanation will be made using the configuration of FIG. 1 as an example.

As shown in FIG. 10, in order to calculate white balance, an imaging device 201a of a camera 301 is operated in the first and second drive modes to image the same subject (e.g., color chart) 303. Predetermined three-color RGB values L1 (R, G, B), L2 (R, G, B), and L3 (R, G, B) are held in the DRAM 203 from live view display image data. On the other hand, the WB correction circuit 204a of the image signal processing circuit 204 makes white balance corrections using arbitrary still image shooting white balance gain WBs in a still image shooting image. Thereafter, the synchronization circuit 204b executes synchronization processing with respect to image data after white balance corrections are made. Further, the color converter circuit 204c makes color conversion using an arbitrary still image shooting color conversion matrix CMXs. The microcomputer 210 extracts three target color RGB values D1 (R, G, B), D2 (R, G, B), and D3 (R, G, B) for white balance correction and color conversion from image data (third image data) obtained by the color converter circuit 204c.

The microcomputer 210 calculates the color conversion matrix and the white balance gain as a live view display color conversion matrix CMXl and a white balance gain WBl. In this case, the color conversion matrix and the white balance gain set RGB values L1 (R, G, B), L2 (R, G, B), and L3 (R, G, B) as the previously extracted RGB values D1 (R, G, B), D2 (R, G, B), and D3 (R, G, B).

Figure 11:
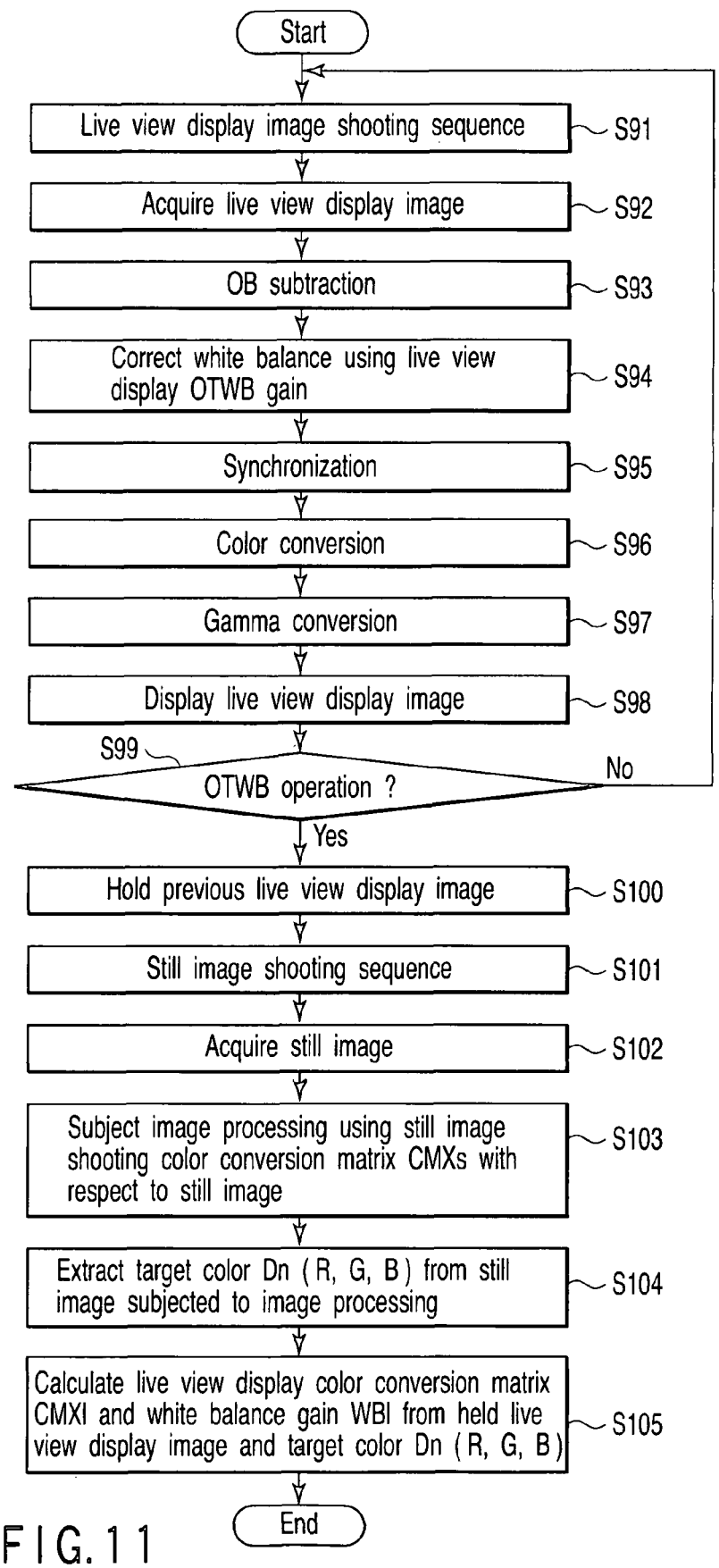
FIG. 11 is a flowchart to explain a procedure of calculating white balance gain and color conversion matrix in the third embodiment.

The flow of the calculation will be hereinafter described. FIG. 11 is a flowchart to explain a procedure of calculating white balance gain and color conversion matrix in the third embodiment. In this case, the procedure of FIG. 11 corresponds to the case of making live view display before still image shooting.

In FIG. 11, the microcomputer 210 takes a procedure of making live view display on the LCD 206. Thus, the microcomputer 210 operates the imaging device 201a of the imaging module 201 in the second drive mode (step S91). In this way, the imaging device 201a acquires live view display image data (step S92). The imaging device 201a stores the obtained live view display image data in the DRAM 203 via the bus 202.

An OB subtraction circuit (not shown) executes OB subtraction processing (step S93). After the OB subtraction processing, the microcomputer 210 reads the live view display white balance gain WBl calculated in the previous calculation and stored in the flash memory 212, and then, outputs it to the WB correction circuit 204a. The WB correction circuit 204a makes white balance corrections in the following manner (step S94). Namely, the circuit 204a multiplies the OB subtracted image data by the live view display white balance gain WBl notified from the microcomputer 210. The synchronization circuit 204b executes synchronization processing with respect to image data after white balance corrections are made (step S95). The microcomputer 210 reads, the live view display color conversion matrix CMXl stored in the flash memory 212, and then, outputs it to the color converter circuit 204c. The color converter circuit 204c executes color conversion in he following manner (step S96). Namely, the circuit 204c multiplies the live view display color conversion matrix CMXl notified from the microcomputer 210 by the image data. The gamma converter circuit 204d makes gamma conversion with respect to an output of the color converter circuit 204c (step S97).

The foregoing image processing is made, and thereafter, the LCD driver 205 reads the image data from the DRAM 203, and displays it as a live view image on the LCD 206 (step S98).

While the live view display described in step S91 to step S98 is made, the microcomputer 210 determines whether or not the user makes a one touch white balance (OTWB) operation (step S99). In step S99, if the user does not make the OTWB operation, the procedure sequence returns to step S91, and then, the microcomputer continues the live view display.

On the other hand, if the user makes the OTWB operation in step 99, the microcomputer 210 takes the following procedure (step S100). Namely, the microcomputer 210 extracts three color RGB values L1 (R, G, B), L2 (R, G, B) and L3 (R, G, B) corresponding the target color from the live view display image data acquired by the imaging device 201a just before the user makes the OTWB operation, and then holds it in the DRAM 203.

After holding the live view display image RGB value corresponding to the target color in the DRAM 203, the microcomputer 210 operates the imaging device 201a of the imaging module 201 in the first drive mode (step S101). In this way, the imaging device 201a acquires still image data (step S102). The imaging device 201a stores the obtained still image data in the DRAM 203 via the bus 202.

An OB subtraction circuit (not shown) executes OB subtraction processing with respect to the image data stored in the DRAM 203. The WB correction circuit 204a makes white balance corrections on the image data in the following manner. The circuit 204a multiplies the OB subtracted imaged data by an arbitrary still image shooting white balance gain WBs. The synchronization circuit 204b executes synchronization processing with respect to the image data after white balance corrections are made. The color converter circuit 204c makes color conversion in the following manner (step S103). The circuit 204c multiplies an arbitrary still image shooting color conversion matrix CMXs by the image data. After color conversion, the microcomputer 210 extracts three color RGB values D1 (R, G, B), D2 (R, G, B) and D3 (R, G, B) from the image data after color conversion obtained in step S103, and then, stores it in the DRAM 203 (step S104).

The microcomputer 210 calculates color conversion matrix and white balance gain as live view display color conversion matrix CMXl and white balance gain WBl (step S105). In this case, the RGB value L1 (R, G, B) is set as the target color RGB value D1 (R, G, B). The RGB value L2 (R, G, B) is set as the target color RGB value D2 (R, G, B). The RGB value L3 (R, G, B) is set as the target color RGB value D3 (R, G, B). Via the foregoing procedures, calculation of color conversion parameters ends.

According to the third embodiment, live view display white balance gain WBl and live view display color conversion matrix CMXl are calculated based on the foregoing arbitrary still image shooting white balance gain WBs and still image shooting color conversion matrix CMXs. In this way, the same reproduction is obtained in still image shooting and in live view display regardless of shooting environment. In addition, a target color reproduction is obtained in the still image shooting.

In FIG. 10, three target colors are extracted. In general, the color conversion matrix is a 3×3 matrix; therefore, three target colors are extracted, and thereby, the color conversion matrix is calculated. In this case, four or more target colors may be extracted. The color conversion matrix is calculated from four or more target colors, and thereby, a 3×3 color conversion matrix can be calculated so that proper color conversion is made in accordance with shooting conditions.

The electronic imaging apparatus of the foregoing embodiments is given using a single-lens reflex camera as one example. In this case, the method of the foregoing embodiments is applicable to a compact camera.

According to the foregoing embodiments, the imaging device 201a is driven in the live view display drive mode as the second drive mode. The second drive mode is not limited to the live view display drive mode so long as it is a mode of thinning part of the output of the imaging device and reading it. For example, in addition to the live view display drive mode, a moving image shooting drive mode and a drive mode of recording part only of still image may be given.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic imaging apparatus comprising:
a color imaging device which has several drive modes including at least first and second drive modes;
a shooting unit which continuously executes, for a same imaging subject, an operation of acquiring a first image data by driving the color imaging device in the first drive mode and an operation of acquiring a second image data by driving the color imaging device in the second drive mode; and
a color conversion parameter calculator which calculates each of a first color conversion parameter for color-converting the first image data and a second color conversion parameter for color-converting the second image data, each of the color-converted first image data and the color-converted second image data coinciding with one or more target color data,
wherein the first color conversion parameter is a first color matrix for the first drive mode, and the second color conversion parameter is a second color matrix for the second drive mode.

2. The electronic imaging apparatus according to claim 1, wherein the first drive mode is a still image shooting drive mode.

3. The electronic imaging apparatus according to claim 1, wherein the second drive mode includes a live view display drive mode.

4. The electronic imaging apparatus according to claim 1, wherein the shooting unit executes the operation of acquiring the first image data and the operation of acquiring the second image data when receiving a user's operation.

5. The electronic imaging apparatus according to claim 4, wherein the user's operation is a one-touch white balance setting operation for manually setting a white balance.

6. The electronic imaging apparatus according to claim 1, wherein the first and second color conversion parameters are calculated using at least one factor independent of the electronic imaging apparatus.

7. The electronic imaging apparatus according to claim 6, wherein the at least one factor independent of the electronic imaging apparatus is a spectral radiance characteristic of a light source.

8. An electronic imaging apparatus comprising:
a color imaging device which has several drive modes including at least first and second drive modes;
a shooting unit which continuously executes, for a same imaging subject, an operation of acquiring a first image data by driving the color imaging device in the first drive mode and an operation of acquiring a second image data by driving the color imaging device in the second drive mode; and a color conversion parameter calculator which color-converts the first image data using an arbitrary color conversion parameter to generate a third image data, and calculates a color conversion parameter for color-converting the second image data so that color reproduction of the second image data coincides with that of the third image data, wherein the arbitrary color conversion parameter is a first color matrix for the first drive mode, and the color conversion parameter is a second color matrix for the second drive mode.

9. The electronic imaging apparatus according to claim 8, wherein the first drive mode is a still image shooting drive mode.

10. The electronic imaging apparatus according to claim 8, wherein the second drive mode includes a live view display drive mode.

11. The electronic imaging apparatus according to claim 8, wherein the shooting unit executes the operation of acquiring the first image data and the operation of acquiring the second image data when receiving a user's operation.

12. The electronic imaging apparatus according to claim 11, wherein the user's operation is a one-touch white balance setting operation for manually setting a white balance.

13. The electronic imaging apparatus according to claim 8, wherein the color conversion parameter is calculated using at least one factor independent of the electronic imaging apparatus.

14. The electronic imaging apparatus according to claim 13, wherein the at least one factor independent of the electronic imaging apparatus is a spectral radiance characteristic of a light source.

15. An electronic imaging method using a color imaging device having several drive modes including at least first and second drive modes, comprising:

continuously executing, for a same imaging subject, an operation of acquiring a first image data by driving the color imaging device in the first drive mode and an operation of acquiring a second image data by driving the color imaging device in the second drive mode; and calculating each of first and second color conversion parameters for color-converting the respective first and second image data acquired via the continuous acquisition operation, each of the color-converted first and second image data coinciding with one or more target color data, wherein the first color conversion parameter is a first color matrix for the first drive mode, and the second color conversion parameter is a second color matrix for the second drive mode.

16. The electronic imaging method according to claim 15, wherein the first and second color conversion parameters are calculated using at least one factor independent of an electronic imaging apparatus.

17. The electronic imaging method according to claim 16, wherein the at least one factor independent of the electronic imaging apparatus is a spectral radiance characteristic of a light source.

18. An electronic imaging method using a color imaging device having several drive . modes including at least first and second drive modes, comprising:

continuously executing, for a same imaging subject, an operation of acquiring a first image data by driving the color imaging device in the first drive mode and an operation of acquiring a second image data by driving the color imaging device in the second drive mode;

processing the first image data acquired via the continuous acquisition operation using an arbitrary color conversion parameter to generate a third image data; and calculating a color conversion parameter for color-converting the second image data so that color reproduction of the second image data acquired via the continuous acquisition operation coincides with that of the third image data, wherein the arbitrary color conversion parameter is a first color matrix for the first drive mode, and the color conversion parameter is a second color matrix for the second drive mode.

19. The electronic imaging method according to claim 18, wherein the color conversion parameter is calculated using at least one factor independent of an electronic imaging apparatus.

20. The electronic imaging method according to claim 19, wherein the at least one factor independent of the electronic imaging apparatus is a spectral radiance characteristic of a light source.

* * * * *